United States Patent
Starkweather

[11] 3,995,110
[45] Nov. 30, 1976

[54] FLYING SPOT SCANNER WITH PLURAL LENS CORRECTION

[75] Inventor: Gary K. Starkweather, Saratoga, Calif.

[73] Assignee: Xerox Corporation, Stamford, Conn.

[22] Filed: Oct. 20, 1975

[21] Appl. No.: 623,851

Related U.S. Application Data

[63] Continuation of Ser. No. 426,890, Dec. 20, 1973, abandoned.

[52] U.S. Cl. ............... 178/7.6; 178/DIG. 27; 350/285
[51] Int. Cl.² ............................................. H04N 1/24
[58] Field of Search ....... 178/7.6, DIG. 27, DIG. 28, 178/6.7 A; 350/7, 285

[56] References Cited
UNITED STATES PATENTS

| | | | |
|---|---|---|---|
| 2,844,648 | 7/1958 | Rosenthal | 178/DIG. 27 |
| 2,976,362 | 3/1961 | Stamps | 178/7.6 |
| 3,750,189 | 7/1973 | Fleischer | 350/7 |
| 3,787,107 | 1/1974 | Sick | 350/7 |

Primary Examiner—Robert L. Griffin
Assistant Examiner—Michael A. Masinick
Attorney, Agent, or Firm—M. J. Colitz; T. J. Anderson; L. Zalman

[57] ABSTRACT

A flying spot scanning system is provided by utilizing reflected light from a multifaceted rotating polygon which is then directed to the scanned medium. A light source illuminates a portion of the mirrored sides of the polygon during each scanning cycle, to provide a desired sequence of spot scanning. In each scanning cycle, information is transmitted to the scanned medium by modulating the light from the light source in accordance with a video signal. An optical convolution of elements including at least two lenses having power in one optical plane and substantially no power in the other plane, is provided in combination with the polygon. One of these lenses is placed in the optical path between the polygon and the scanned medium with its power plane substantially parallel to the axis of rotation of the polygon for allowing a wide variance in runout tolerance of the scanning system. The other lens is placed in the optical path between the light source and the polygon with its power plane substantially perpendicular to the axis of rotation of the polygon.

17 Claims, 5 Drawing Figures

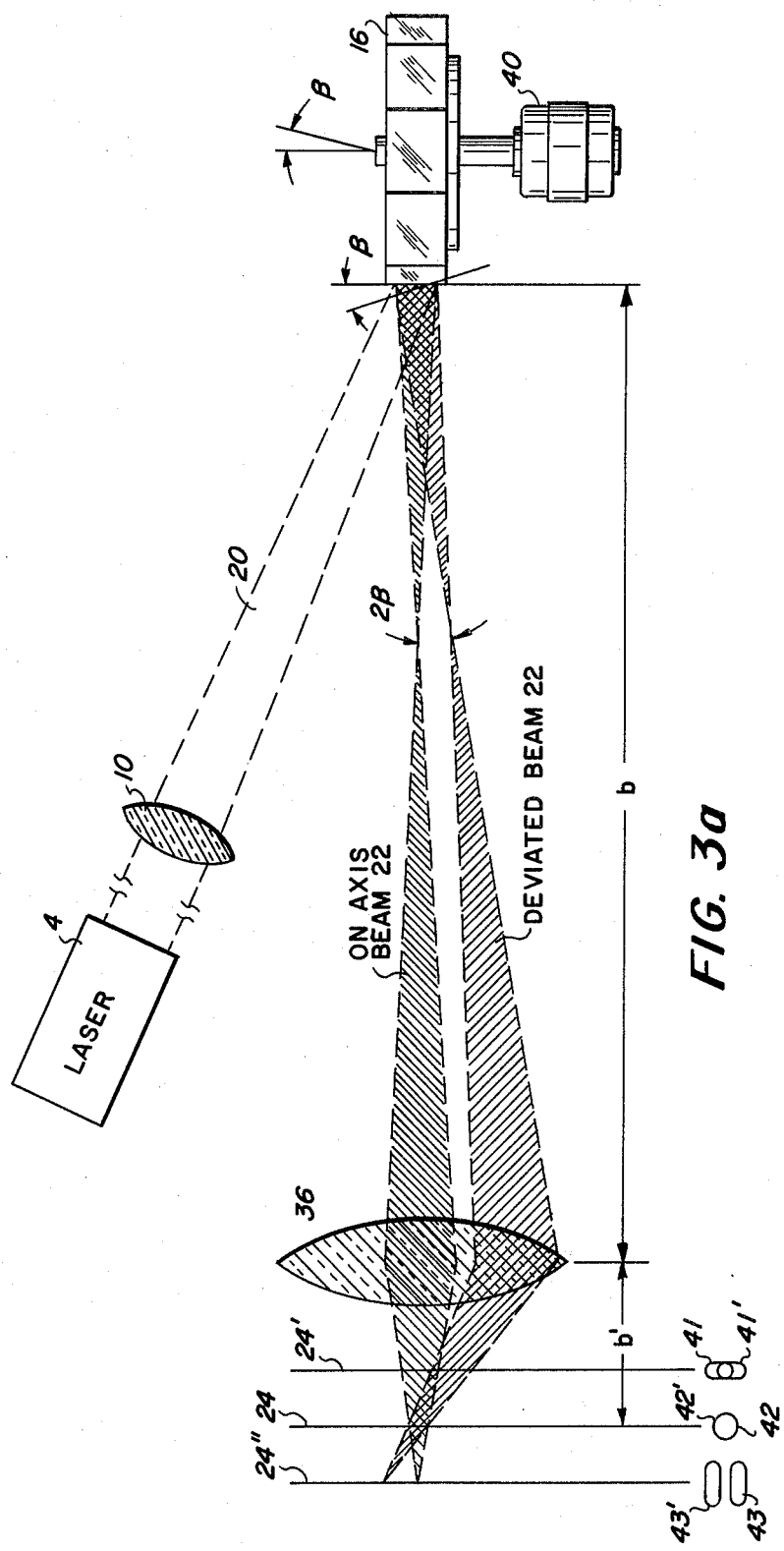

FLYING SPOT SCANNER WITH PLURAL LENS CORRECTION

RELATED APPLICATION

This application is a continuation application of application Ser. No. 426,890, filed Dec. 20, 1973 now abandoned.

BACKGROUND OF THE INVENTION

This invention relates to a flying spot scanning system for communicating video information to a scanned medium, and more particularly to a scanning system which utilizes a multifaceted rotating polygon for controlling the scanning cycles.

Much attention has been given to various optical approaches in flying spot scanning for the purpose of imparting the information content of a modulated light beam to a scanned medium. Galvanometer arrangements have been used to scan the light across a document for recording its information content thereon. Such arrangements have included planar reflecting mirrors which are driven in an oscillatory fashion. Other approaches have made use of multifaceted mirrors which are driven continuously. Various efforts have been made to define the spot size in order to provide for an optimum utilization of the scanning system.

One such effort is that described in U.S. Pat. No. 3,675,016. The approach used was to make the spot size invariant and as small as possible by defining the dimensions of the focused beam so that only part, preferably half, of a mirror facet is illuminated during scanning. This teaching alludes to generalized techniques for assuring the constancy of the size of the aperture of a rotating mirror scanning system. By either illuminating several facets of the mirror or by directing light in a beam that is sufficiently narrow to assure that less than a full facet is the most that can ever be illuminated by the beam and limiting scanning to that portion of the rotary travel of the facet when such facet is illuminated by all of such light beam. However, such system apertures are dimensionally invariant because the dimensions of the rotating facets have no influence on such apertures.

While the system as described in U.S. Pat. No. 3,675,016 may have advantages over the prior art, nevertheless, various constraints must be imposed upon the spot size and other relationships of optical elements within the system which are not always desirable.

In copending U.S. patent application Ser. No. 309,874, filed on Nov. 27, 1972, now abandoned in favor of Ser. No. 626,167 and assigned to the assignee of the present invention, a flying spot scanning system is provided which does not have constraints imposed upon the spot size and other relationships of optical elements within the system which are not always desirable. As taught therein, a finite conjugate imaging system may be in convolution with the light beam and the rotating polygon. A doublet lens, in series with a convex imaging lens between the light source and the medium provides such arrangement. Additionally, a cylindrical lens is positioned in the optical path between the polygon and the scanned medium to compensate for runout and polygon facet errors.

It is thus an object of the present invention to further improve this flying spot scanning system which may tolerate substantial runout and facet errors.

It is a further object of the present invention to provide a spot scanning system which utilizes a multifaceted rotating polygon for controlling scanning cycles.

It is yet another object of the present invention to provide a spot scanning system which provides an effective uniform spot size at the contact loci of the spot with the scanned medium, with increased system efficiencies.

It is still another object of the present invention to provide a spot scanning system which assures an improved sequence of scanning cycles.

It is also an objective of the present invention to provide a flying spot scanning system which includes as optical elements at least two lenses, characterized by an optical plane having power and the other plane having substantially no power, for increasing the depth of focus of the optical system, as well as compensating for runout and polygon facet errors.

Other objects of the invention will be evident from the description hereinafter presented.

SUMMARY OF THE INVENTION

The invention provides a flying spot scanning system which employs a multifaceted rotating polygon as the element for directing a beam of light to focus to a spot upon a medium and for enabling the spot to traverse the medium throughout a scan width. A light source, such as a laser, generates a beam of light substantially orthogonal to the facets of the polygon which illuminated facets in turn reflect the impinging light beam toward the medium in successive scanning cycles. Additional optical elements are provided in convolution with the light source and the polygon to provide a desirable depth of focus of the spot and a sufficient resolution of the optical system.

Another feature of the invention is the inclusion of a lens, having power in one optical plane and substantially no power in the other plane, in the optical path between the polygon and the scanned medium with its power plane substantially parallel to the axis of rotation of the polygon. The light beam reflected from the facets of the polygon impinge upon the convex surface of the lens to be directed to a predetermined position on the surface of the scanned medium regardless of runout and facet errors.

Yet another feature of the invention is the inclusion of a second lens similarly characterized in the optical path between the light source and the polygon with its power plane substantially perpendicular to the axis of rotation of the polygon for imaging the beam of light onto the facets of the polygon.

Still another feature of the invention is the modulation of the original light beam by means of a video signal. The information content within the video signal is thereby imparted to the light beam itself. The medium to be scanned is one which is responsive to the modulated beam and records its information content as contained within the scaning spot in a usable form on its surface across the scan width.

Yet another feature of the invention includes an embodiment of the flying spot scanning system for utilization in high speed xerography. The scanned medium in such an embodiment would consist of a xerographic drum which rotates consecutively through a charging station, an exposure station where the spot traverses the scan width of the drum, through a developing station, and a transfer station where a web of copy paper is passed in contact with the drum and receives an electrostatic discharge to induce the transfer of the developed image from the drum to the copy paper. A fusing device then fixes the images to the copy paper as it passes to an output station.

These and other features which are considered to be characteristic of this invention are set forth with particularity in the appended claims. The invention itself, however, as well as additional objects and advantages thereof, will best be understood in the following description when considered in conjunction with the accompanying drawings.

DESCRIPTION OF THE DRAWINGS

FIG. 3a is a beam diagram corresponding to FIG. 2a and illustrates the compensation for scanner tilt provided by correction lenses.

DESCRIPTION OF THE PREFERRED EMBODIMENT

Figure 1:
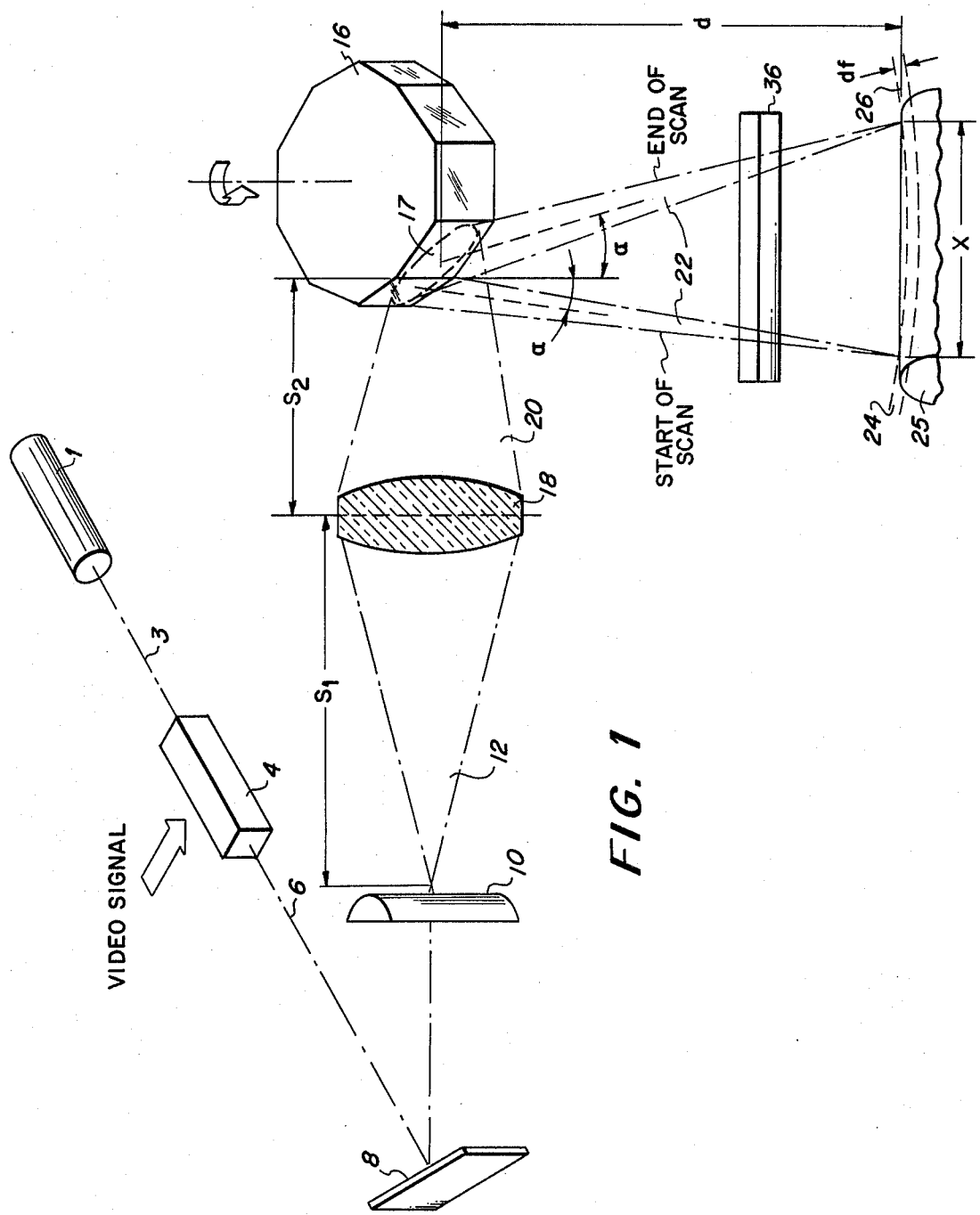
FIG. 1 is an isometric illustration of a flying spot scanning system in accordance with the invention.

In FIG. 1, an embodiment of a flying spot scanning system in accordance with the invention is shown. A light source 1 provides the original light beam for utilization by the scanning system. The light source 1 is preferably a laser which generates a collimated beam of monochromatic light which may easily be modulated by modulator 4 in conformance with the information contained in a video signal, although any source of directed light may be employed.

Modulator 4 may be any suitable modulator, such as those electro-optical or acouto-optical in nature, for recording the video information in the form of a modulated light beam 6 at the output of the modulator 4. The modulator 4 may be, for example, a Pockel's cell comprising a potassium dihydrogen phosphate crystal, whose index of refraction is periodically varied by the application of the varying voltage which represents the video signal. The video signal may contain information either by means of binary pulse code modulation or wide-band frequency code modulation. In any event, by means of the modulator 4 the information within the video signal is represented by the modulated light beam 6.

The light beam 6 is reflected from mirror 8 in convolution with a cylindrical lens 10. The lens 10 is positioned in the optical path between the mirror 8 and the polygon 16 with its power plane substantially perpendicular to the axis of rotation of the polygon 16. The lens 10, in combination with an imaging lens 18, images the beam 6 to a horizontal fan of energy which defines a beam distribution on the order of 40 millimeters in the power plane and 1 millimeter in the direction parallel to the axis of rotation of the polygon 16 at the polygon 16 to illuminate at least two facets of the polygon 16. The lens 10 is required to image either a virtual or real axial point of beam 6 through a focal point, for example, on the opposite side of lens 10 for a real image. At the focal point, beam 6 diverges or expands to form beam 12 which impinges upon at least two contiguous facets of a scanning polygon 16. The lens 10 may either be bi-convex, plano-convex, meniscus or even spherical or toric provided that the power plane is similarly oriented to the polygon 16.

At a distance S2 from the mid-scan position of the illuminated facet of polygon 16 is positioned an imaging lens 18. Lens 18 is of a diameter to cooperate with the expanded light beam 12 to render a convergent beam 20 which illuminates the desired facets to reflect respective light beams 22 to the surface 26 of a recording medium 25. In this preferred embodiment, imaging lens 18 is a 1—$n$ element lens. In an alternate embodiment, the imaging lens 18 could be positioned in the optical path between the polygon 16 and the medium 25, as described in copending U.S. patent application Ser. No. 309,874, filed on Nov. 27, 1972, and assigned to the assignee of the present invention.

In the preferred embodiment, the rotational axis of polygon 16 is orthogonal to the plane in which light beams 6 travels. The facets of the polygon 16 are mirrored surfaces for the reflection of any illuminating light impinging upon them. With the rotation of the polygon 16, assuming two contiguous facets are illuminated at a given time, a pair of light beams 22 are reflected from the respective illuminated facets and turned through a scan angle $\alpha$ for flying spot scanning. Alternatively, flying spot scaning could be provided by any other suitable device, such as mirrored piezoelectric crystals or planar reflecting mirrors which are driven in an oscillatory fashion.

In all of these arrangements, however, the mid-scan position of the reflecting surfaces would be at a distance $S_1 + S_2$ from the originating focal point of light beam 12 and in orthogonal relation to the plane bounded by the beam 6 such that the reflected beams would be in substantially the same plane as beam 6.

Medium 25 may be a xerographic drum (not shown) which rotates consecutively through a charging station depicted by corona discharge device, an exposure station where the beam from the rotating polygon 16 would traverse a scan width $x$ on the drum, through a developing station depicted by a cascade development enclosure, a transfer station where a web of copy paper is passed in contact with the drum and receives an electrostatic discharge to induce a transfer of the developed image from the drum to the copy paper. A fusing device fixes the images to the copy paper.

Usable images are provided in that the information content of the scaning spot is represented by the modulated or variant intensity of light respective to its position within the scan width $x$. As the spot traverses a charged surface, the spot dissipates the electrostatic charge in accordance with its light intensity. The electrostatic charge pattern thus produced would be developed in the developing station and then transferred to the final copy paper. The xerographic drum would be cleaned by some cleaning device such as a rotating brush before being recharged by the charging device. In this manner, the information content of the scanned spot is recorded on a more permanent and useful medium. Of course, alternative prior art techniques may be employed to cooperate with a scanned spot in order to utilize the information contained therein.

As shown in FIG. 2, the polygon 16 is continuously driven by a motor 40 and may be synchronized in rotation to a synchronization signal representative of the scan rate used to obtain the original video signal. In the case of the utilization of a xerographic drum, the rotation rate of the drum determines the spacing of the scan lines. The rotation of the polygon 16 off-axis from that desired causes runout errors or, in this case, a deflection of the beam 22 in the vertical direction away from the desired scan line.

Figure 2A:
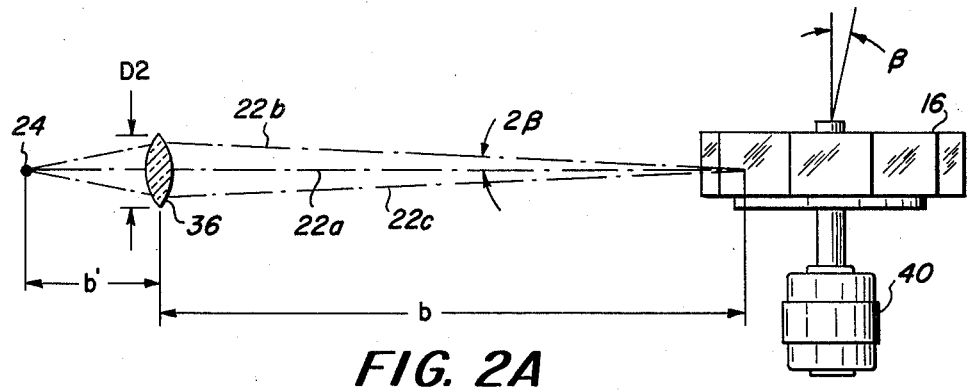
FIG. 2a is a side perspective view of the utilization of the correction lenses which is an integral part of the flying spot scanning system shown in FIG. 1.

In FIG. 2a, center lines 22a, 22b, 22c of beam 22 are shown with center line 22a being that of an undeviated beam and center lines 22b and 22c being that of beams which have been deviated in opposite vertical directions away from the desired scanning plane. Assuming an angular deviation or tilt of β from the desired axis of rotation for the polygon 16, the position of the scan spot in the vertical direction or direction normal to the direction of scan, i.e., runout error, will be deflected from the desired position by an amount proportional to the angular deviation 2β of the beam. Other misalignments of optical elements within the system, such as facet misalignment, also may cause the same runout effects. For example, if the scanner comprises 24 facets, each having a different alignment, 24 different runout errors may occur.

Since runout errors and polygon facet errors may cause poor results in terms of the quality of image transfer to the scanned medium, a cylindrical lens 36 is positioned in the optical path between the polygon and the scanned medium with its aperture aligned with the aperture of the polygon 16. The lens 36 may be either bi-convex, plano-convex or meniscus or even spherical or toric provided that its power plane is similarly oriented. As shown in FIGS. 1 and 2, the plane of no power of the lens 36 is substantially parallel to the direction of scan or the tangential plane. The disposition of the cylindrical lens 36 in the optical path compensates for such runout effects. The lens 36 is located at a distance $b$ from the origin of the angular deflection $2\beta$. The compensation is effected in that the off-axis beam passes through the convex surfaces of lens 36. Then, the lens 36 focuses the facet height, in the sagittal plane, onto a focal plane 24 at a distance $b'$ from the lens 36. Preferably, the cylindrical lens 36 is located at a distance from the surface 26 of the medium 25 approximately equal to the focal length $f_2$ of the lens 36.

Figure 2B:
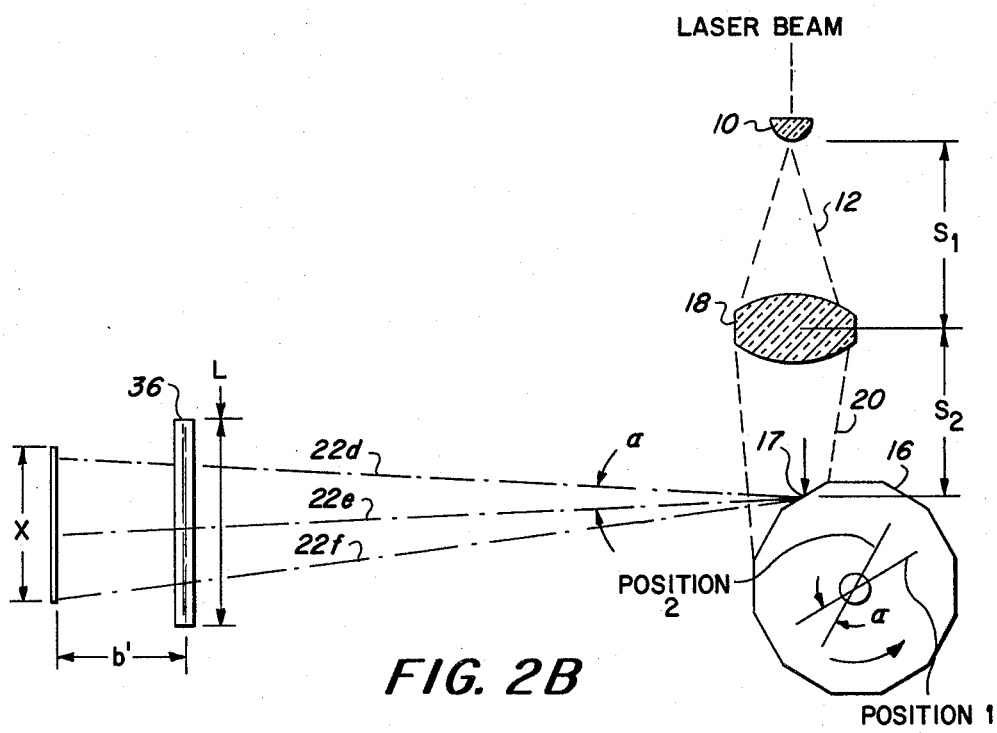
FIG. 2b is a top perspective view of the utilization of both correction lenses.

With reference to the optical system, in FIG. 2b, center lines 22d, 22e and 22f of the beam 22 are shown designating start of scan, midscan and end of scan positions, respectively, as the beam 22 is swept across the medium by a facet 17 as the polygon 16 rotates between positions 1 and 2. Referring to FIG. 2a, the cylinder lens 36 images the facet in the sagittal plane onto the facet focal plane 24 located a distance $b'$ therefrom. The focal length $f_2$ of lens 36 is defined as $1/f_2 = 1/b' + 1/b$. In this plane 24, the effect of wobble or runout error will be substantially eliminated as the spots reflected by different facets 17 will fall at the same vertical location.

Figure 3B:
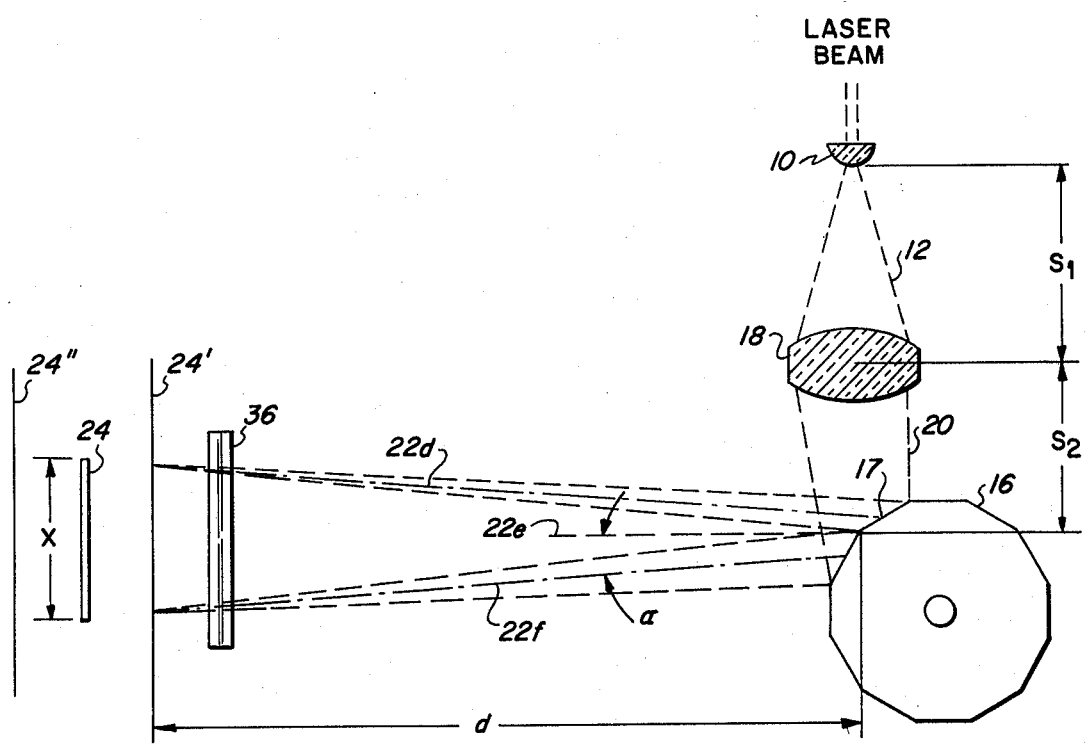
FIG. 3b is a beam diagram corresponding to FIG. 2b.

With the above described optical system, minimum scaning spot size and correction for scanner wobble does not necessarily occur at the same image plane. This is readily understood from the following discussion with reference to FIGS. 3a and 3b, which are beam diagrams corresponding to FIGS. 2a and 2b, respectively. Referring to FIG. 3b, the lens 10 in convolution with the imaging lens 18 provides a finite conjugate imaging system in the tangential plane, which focuses the beam 22 as a spot on tangential image focal plane 24' located between lens 36 and plane 24 and a distance $d$ from the mid-scan position of facet 17. The focal length of lens 18, $f$, is defined as $1/f = 1/S_1 + 1/(s_2 + d)$. Referring to FIGS. 3a and 3b, the lenses 18 and 36 act in conjunction with one another to focus the portion of the beam 22 in the sagittal plane onto a plant 24''. At plane 24', 24 and 24'' the scanned spot takes a shape similar to that as illustrated by spots 41, 42 and 43, respectively. The spot 41 is of minimum width or horizontal dimension at its tangential plane of focus 24', while the width of the scanning spot progressively increases in the other planes as shown by successive spots 42 and 43. The spot 43 is of minimum height or vertical dimension in its sagittal plane of focus 24''. The height of the scanning spot progressively decreases to its minimum size from the other planes as shown by successive spots 41 and 42.

FIG. 3a illustrates in more detail the effect of focusing the facet 17 onto the plane 24 to substantially eliminate wobble or runout errors. Only an on-axis beam and one deviated beam is shown for clarity. The spots 41', 42' and 43' are spots on a deviated beam and correspond to spots 41, 42 and 43 of an on-axis or non-deviated beam. It can be seen that the spots 43 and 43' are separated from each other, spots 41 and 41' overlap each other, while spots 42 and 42' are substantially coincident. Thus, the non-deviated and deviated spots are not vertically aligned in planes 24' and 24'', while they are substantially aligned in plane 24. Depending upon the system used, spots 41 and 41' and 43 and 43' may be of different configurations and take different positions relative to each other, but only spots 42 and 42' in the plane 24 will be substantially coincident.

The plane 24 is in a location where the spot is increasing its horizontal dimension and decreasing its vertical dimension. It is desirable that the vertical and horizontal dimensions of the spot be substantially equal for optimum spot size. Therefore, from a practical standpoint, the location of plane 24 may be changed such that its distance from lens 36 varies slightly from the distance $b'$ to find the plane of optimum spot size and minimum wobble, which plane may be referred to as the plane of best focus. Thus, the recording medium 25 is placed in a location where its surface 26 is in the plane of best focus.

In defining the following relationships, for practical purposes, the plane 24 can be considered as coincident with the surface 26.

The minimum aperture of lens 36 which may be utilized to practice the invention is given by the following relationship:

$$D_2 \cong 2b \tan\beta$$

However, a constant aperture size for lens 36 of, for example, approximately one-half inch is sufficient for most applications.

Having defined $f_2$ and assuming a constant value for $D_2$, it is helpful to determine the necessary $(f/\text{number})_2$ for the lens 36:

$$(f/\text{number})_2 = f_2/D_2 = b'/2 \tan\beta \ (b' + b)$$

An optimum relationship between the lens 10, the lens 18, and the polygon 16 is established as described in the following mathematical expressions:

The focal length of the lens 18 produces a magnification or minification M in the distance along the beam path from the focal point of lens 10 to the recording surface. This distance, $D_T$, is $S_1 + S_2 + d$. The magnification of the lens 18 is then $$M = S_2 + d/S_1$$

The focal length $f_o$ of the lens 10 is such that the horizontal (plane of scan) extent of the spot produced by it is governed in the following manner. Since a laser beam is essentially collimated, then the horizontal spot size $W_H$ is $W_H = 2.44\ \lambda f_o/h$ if lens 10 is the limiting aperture, where $\lambda$ is the wavelength of light and $h$ is the diameter of the beam directed by laser or light source 1 at the focal point of the lens 10. In this case, the spot size $W_H$ is said to be diffraction limited since the beam extent and focal length of the lens 10 determines the spot size and not source extent, that is, the wavelength of the laser light combined with the focusing geometry limit the spot size. In many applications, however, the laser beam is smaller than the aperture of lens 10 (Gaussian case) and the horizontal spot size $W'_H$ is given by $W'_H \approx 2.0\ \lambda\ f_o/h$. Should the light source 1 have appreciable size, that is, from a finite (non-laser) source, then the spot size $W''_H$ is determined by the following equation:

$$W''_H \cong f_o \tan \Theta$$

where $\Theta$ is the angular subtend of the emitting area of the source 1 as seen from the position of the lens 10.

If the desired spot size at the recording surface is Q, then the required magnification of the lens 18 would be $$M = Q/W_H \text{ or } M = Q/W'_H$$

for the diffraction limited and Gaussian cases, respectively. For the case of appreciable source size, then $$M = Q/W''_H$$

Once M is known, then the focal length $f_1$ of lens 18 can be approximately determined by the following equation:

$$f_1 = \frac{S_1 + S_2 + d}{(M + 1/M + 2)} = \frac{D_T}{(M + 1/M + 2)}$$

The number of facets in this preferred embodiment has been found to be optimum if at least 20 to 30 facets are employed. The scan angle $\alpha$ traversed would be equal to the number of facets chosen in relation to one complete revolution of the polygon 16. An extremely useful arrangement would have the polygon 16 with 24 facets and a scan angle $\alpha$ of 15°. A depth of focus requirement df of the convering beam 22 is related to the scan angle $\alpha$ in that as the scan angle $\alpha$ increases the radius of curvature of the focal plane 24 increases, it is important to define a scan angle $\alpha$ in relation to the desired scan width $x$. For a scan width $x$ of approximately 11 inches it has been found that the scan angle $\alpha$ of 12° to 18°, with 20 to 30 facets on the polygon 16, is optimum. To insure that lens 36 is sufficiently wide, a length L is provided approximately equal to or greater than the scan width.

The optical system of the present invention provides a virtually 100% duty cycle scan for the entire scan angle by virtue of the illumination of at least two contiguous facets. The illumination of two contiguous facets is preferred. With such illumination, another scanning spot is provided at a distance equal to the scan width $x$ behind the leading scanning spot with virtually no wait between successive scans. With the continuous rotation of the polygon 16 additional contiguous facets are subsequently illuminated, thereby providing successive convergent beams following the leading convergent beam 22 by no more than the scan angle, if so desired. Thus, a flying spot scanning system which has an extremely high duty cycle is provided.

Another benefit of the particular convolution of optical elements herein defined is that the focal length $f_2$ of the lens 36 may be sufficiently large to yield an increased depth of focus df and to enable distancing lens 36 from the recording medium 25 to reduce otherwise stringent surface quality requirement for the lens 36.

What is claimed is:

1. Apparatus for recording information from an electrical signal onto a scanned medium comprising:
    means for providing a beam of high intensity light;
    means for modulating the light beam in accordance with the information content of an electrical signal;
    optical means for imaging said modulated beam to a spot in a focal plane at the surface of a light sensitive medium at a predetermined distance from said optical means;
    a multifaceted polygon having reflective facets for reflecting the modulated beam incident to it onto said medium and means for rotating said polygon such that the reflected light is scanned in successive traces across said medium;
    said optical means including a first lens, having power in one optical plane and substantially no power in the other plane, positioned in the optical path of said light beam between said light providing means and said polygon with its power plane substantially perpendicular to the axis of rotation of said polygon for providing a predetermined distribution of light incident upon said polygon; and
    a second lens, having power in one optical plane and substantially no power in the other plane, positioned in the optical path of the imaged beam between said optical means and said medium, with its power plane substantially parallel to the axis of rotation of said polygon, the aperture of said second lens being in convolution with the aperture of said optical means such that runout errors are corrected.

2. The apparatus as defined in claim 1 wherein said first and second lenses are cylindrical lenses.

3. The apparatus as defined in claim 2 wherein said light providing means is a finite source and the focal length of said first cylindrical lens is approximately equal to $W_h/\tan \Theta$, wherein $W_h$ is the horizontal size of the spot at said medium and $\Theta$ is the angular subtend of the emitting area of said light providing means.

4. The apparatus as defined in claim 2 wherein said light source is a laser which emits beam of collimated light of substantially uniform intensity.

5. The apparatus as defined in claim 4 wherein the focal length $f_o$ of said first cylindrical lens is approximately equal to $h\ W_h/2.44\ \lambda$, where $h$ is the diameter of the laser light beam directed at the focal point of said first lens, $W_h$ is the horizontal size of the spot at said medium, and $\lambda$ is the wavelength of the laser light beam.

6. The apparatus as defined in claim 4 wherein the focal length of said first cylindrical lens is approximately equal to $h\ W_h/2.0\lambda$, where $h$ is the diameter of the laser beam directed at the focal point of said first lens, $W_h$ is the horizontal spot size at said medium, and $\lambda$ is the wavelength of the laser light beam.

7. The apparatus as defined in claim 6 wherein said cylindrical lens has a focal number $(f/\text{number})2 \cong b'/[2\tan\beta(b'+b)]$, where $b$ is the distance of said lens from the origin of runout error, $b'$ is the distance of said lens from said focal plane, and $\beta$ is the angular measure of runout error.

8. Apparatus for recording information from an electrical signal onto a scanned medium comprising:
   means for providing a beam of high intensity light;
   means for modulating the light beam in accordance with the information content of an electrical signal;
   first optical means, having power in one optical plane and substantially no power in the other plane, for expanding said modulated beam;
   second optical means in convolution with said first optical means, said second optical means defining a finite conjugate imaging system for imaging said expanded beam to a spot in a focal plane having a large depth of focus coextensive with the surface of a light sensitive medium at a predetermined distance from said second optical means;
   a multifaceted polygon having reflective facets positioned in the optical path of said imaged beam such that certain of said facets are illuminated to reflect said beam toward said medium;
   said first optical means being positioned with its power plane substantially perpendicular to the axis of rotation of said polygon;
   means for rotating said polygon such that said reflected beam is scaned through a scan angle to provide successive spot scaning traces across said medium, and
   third optical means, having power in one optical plane and substantially no power in the other plane, in the optical path of the imaged beam between said second optical means and said medium with its power plane substantially parallel to the axis of rotation of said polygon such that runout errors are corrected.

9. The apparatus as defined in claim 8 wherein said light source is a laser which emits a beam of collimated light of substantially uniform intensity.

10. The apparatus as defined in claim 9 wherein said first optical means is a first cylindrical lens and said third optical means is a second cylindrical lens.

11. The apparatus as defined in claim 10 wherein the focal length $f_o$ of said first cylindrical lens is approximately equal to $h\,W_h/2.44\,\lambda$, where $h$ is the diameter of the laser light beam directed at the focal point of said first lens, $W_h$ is the horizontal size of the spot at said medium, and $\lambda$ is the wavelength of the laser light beam.

12. The apparatus as defined in claim 10 where the focal length $f_o$ of said first cylindrical lens is approximately equal to $h\,W_h/2.0\,\lambda$, where $h$ is the diameter of the laser light beam directed at the focal point of said first lens, $W_h$ is the horizontal spot size of the spot at said medium and $\lambda$ is the wavelength of the laser light beam.

13. The apparatus as defined in claim 12 wherein said second optical means has a focal length $f_1 = (D_T)/M+1/M+2$ where $D_T$ is the distance of said first cylindrical lens from said medium and $M$ is the desired spot size at the medium divided by $W_h$.

14. A flying spot scanning sysem for recording information from a video signal onto a scanned medium comprising:
   a laser for emitting a beam of collimated light of substantially uniform, high intensity;
   means for modulating the light beam in accordance with the information content of a video signal represented by a stream of binary digits;
   means for focusing said beam to a spot upon the surface of a light sensitive medium;
   a multifaceted polygon having reflective facets positioned in the optical path of said focused beam such that certain of said facets are illuminated to reflect said beam toward said medium;
   said focusing means including a first cylindrical lens positioned with its power plane substantially perpendicular to the axis of rotation of said polygon;
   means for rotating said polygon such that said reflected beam is scanned through a scan angle to provide successive spot scanning traces across said medium; and
   a second cylindrical lens positioned in the optical path of said focused beam between said polygon and said medium with its power plane substantially parallel to the axis of rotation of said polygon such that runout errors are corrected.

15. The apparatus as defined in claim 14 wherein the focal length $f_o$ of said first cylindrical lens is approximately equal to $h\,W_h/2.44\,\lambda$, where $h$ is the diameter of the laser light beam directed at the focal point of said first lens, $W_h$ is the horizontal size of the spot at said medium, and $\lambda$ is the wavelength of the laser light beam.

16. The apparatus as defined in claim 14 wherein the focal length $f_o$ of said first cylindrical lens is approximately equal to $h\,W_h/2.0\,\lambda$, where $h$ is the diameter of the laser light beam directed at the focal point of said first lens, $W_h$ is the horizontal size of the spot at said medium, and $\lambda$ is the wavelength of the laser light beam.

17. The apparatus as defined in claim 16 wherein said cylindrical lens is positioned at a distance from said medium approximately equal to the focal length $f_2$ of said lens.

* * * * *